ENERGY LEVEL DIAGRAM FOR $He^3$

F. D. COLEGROVE, JR.
LAIRD D. SCHEARER
GEOFFREY K. WALTERS
INVENTORS

BY James O. Dixon
ATTORNEY

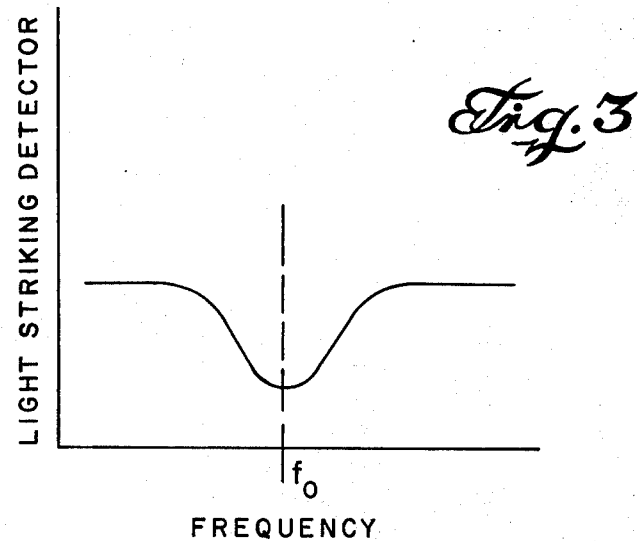
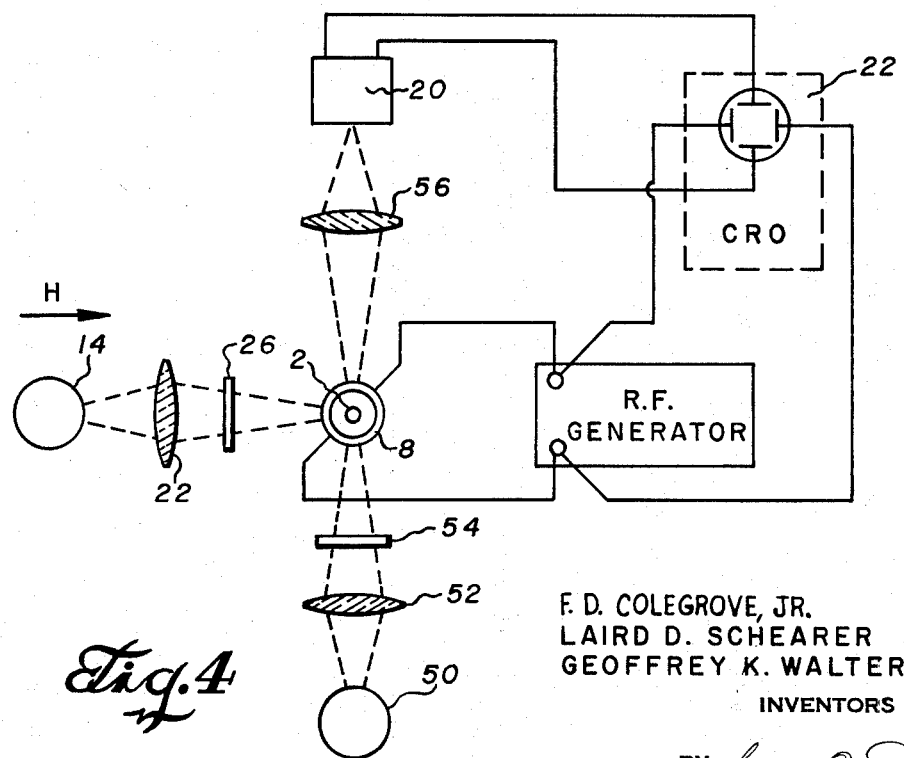
F. D. COLEGROVE, JR.
LAIRD D. SCHEARER
GEOFFREY K. WALTERS
INVENTORS
BY *James O. Dixon*
ATTORNEY

United States Patent Office 3,206,671
Patented Sept. 14, 1965

3,206,671
ATOMIC COLLISION INFLUENCED GASEOUS HELIUM-3 QUANTUM RESONANCE MAGNETOMETER APPARATUS
Forrest D. Colegrove, Jr., Dallas, Laird D. Schearer, Richardson, and Geoffrey K. Walters, Dallas, Tex., assignors to Texas Instruments Incorporated, Dallas, Tex., a corporation of Delaware
Filed Apr. 9, 1962, Ser. No. 186,068
6 Claims. (Cl. 324—0.5)

The present invention relates to a process of and means for polarizing the magneitc sublevels of the $1^1S_0$ ground state of mass 3 isotope of helium ($He^3$) gas by optically pumping the metastable $2^3S_1$ state of the gas. The invention has application to a $He^3$ gas magnetometer, and more genrrally to any system or process that requires the use of $He^3$ gas whose $1^1S_0$ ground state magnetic sublevels are polarized.

An object of this invention is to provide means for polarizing the magnetic sublevels of the $1^1S_0$ ground state of $He^3$ gas.

A feature of the invention resides in the optical pumping of the metastable $2^3S_1$ state of $He^3$ gas by circularly polarized resonance radiation in order to polarize the magneitc sublevels of the $1^1S_0$ ground state.

Another object of the invention is to provide a $He^3$ gas magnetometer capable of measuring the absolute magnitude of an ambient magnetic field insofar as eliminating any recalibration of the system when the orientation of the magnetometer is changed relative to the direction of the ambient magnetic field.

A feature of the $He^3$ gas magnetometer of the invention is the utilization of the energy splitting of the $1^1S_0$ ground state magnetic sublevels of $He^3$ gas to determine the magnitude of an ambient magnetic field.

Other objects, features and advantages will become apparent from the following detailed description when taken in conjunction with the appended claims and the accompanying drawings, in which like reference numerals refer to like parts throughout, and in which:

FIGURE 3 is a graphical representation of a resonance signal derived from the magnetometer; and FIGURE 4 shows the apparatus of another embodiment of a $He^3$ gas magnetometer.

The essence of the invention is the optical pumping of the metastable $2^3S_1$ state of $He^3$ gas by circularly polarized resonance radiation to produce a polarization of the magnetic sublevels of this state which, in turn, produces a polarization of the magnetic sublevels of the $1^1S_0$ ground state. This effect is caused by the strong interaction between the metastable state atoms and the ground state atoms, thus promoting an efficient interchange of angular momentum of the atoms of the two states. And, although the invention will be described hereinafter with special reference to its applicability to a gas magnetometer, it should be understood that there are other uses for the process and means for polarizing the $1^1S_0$ ground state magnetic sublevels of $He^3$ gas.

Figure 1:
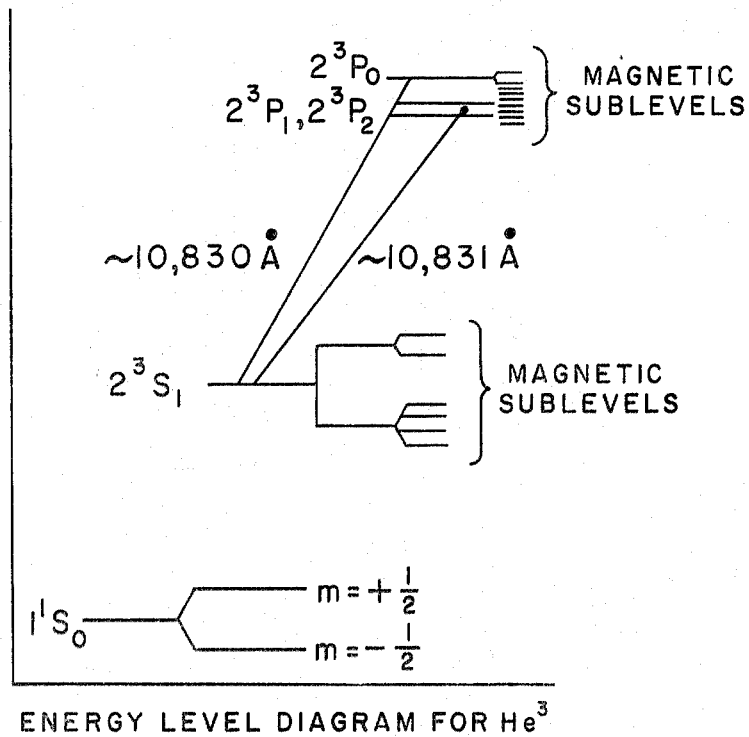
FIGURE 1 is an energy level diagram illustrative of some of the energy states of $He^3$ gas when in the presence of a magnetic field.

Referring now to FIGURE 1 there is shown an energy level diagram for $He^3$ gas that is illustrative of some of the energy states when the $He^3$ gas is in the presence of an ambient magnetic field. The lowest energy level of the $He^3$ gas is the $1^1S_0$ ground state whose nucleus possesses a magnetic moment that causes a splitting of the ground state into two magnetic sublevels when in the presence of an ambient magnetic field. These sublevels are represented by $m=+\frac{1}{2}$ and $m=-\frac{1}{2}$. In addition, there is shown metastable $2^3S_1$ state, whose energy is greater than that of the ground state, and the yet higher energy $2^3P$ states, the latter being denoted by $2^3P_0$, $2^3P_1$, and $2^3P_2$.

The metastable $2^3S_1$ state of the $He^3$ gas is responsive to optical pumping by resonance radiation that is either nonpolarized, linearly polarized or circularly polarized, although the invention to be described is operable only when resonance radiation of the latter type is used. Moreover, circularly polarized resonance radiation from either a $He^3$ gas discharge or a $He^4$ gas discharge is effective in producing the phenomenon of optical pumping of the metastable state atoms of $He^3$ gas. In brief, optical pumping of the metastable state atoms is the raising of these atoms to one of the $2^3P$ states by absorption of resonance radiation, and the subsequent return of these atoms to metastable state by the emission of radiation. In the case of $He^3$ gas there are two major energy levels of the metastable $2^3S_1$ state when in the presence of a magnetic field, and each of these states are split into various magnetic sublevels.

Because of the different probabilities of the magnetic sublevels of the metastable state for absorbing resonance radiation and being raised to one of the higher energy $2^3P$ states, and the equal probabilities for atoms returning to these respective sublevels from the $2^3P$ states by the emission of radiation, some of the sublevels of the metastable state are overpopulated at the expense of the others when resonance radiation is incident thereon. This preferential population of the sublevels is referred to as alignment if the net magnetic moment of all of the metastable atoms is zero even though some sublevels are more populated than others, whereas the preferential population is referred to as polarization if the net magnetic moment of all of the metastable atoms is not zero. It is important to note that only circularly polarized resonance radiation will polarize the metastable state atoms, whereas nonpolarized or linearly polarized light only produce alignment. As the degree of polarization of the sublevels increases, the amount of resonance radiation absorbed by the metastable state atoms changes, until an equilibrium condition occurs, which exists when the degree of polarization becomes constant. In the case described, the amount of resonance radiation absorbed decreases as the polarization increases.

During the process of producing a polarization of the metastable state atoms, the atoms in the $1^1S_0$ ground state become polarized. This is a result of the strong interaction between the metastable state atoms and ground state atoms when they collide. The net result of all of the collisions of this type is to cause a transfer of angular momentum from the metastable state atoms to the ground state atoms to produce a polarization of the latter. It should be noted that because of the splitting of the ground state into only two magnetic sublevels, the relative populations of these sublevels are not affected by this interaction process if the metastable state is aligned but not polarized. However, if the metastable state is polarized, the ground state will become similarly polarized by overpopulating one of the ground state magnetic sublevels at the expense of the other.

In the case of a weak electrical discharge produced in the $He^3$ gas, there are many more ground state atoms than metastable state atoms. For example, a preferred ratio of ground state atoms to metastable state atoms is about $10^5$, although this ratio may be varied widely and still produce operable results. Thus, upon polarization of the metastable state, the transfer of this polarization to the ground state is, for all practical purposes, instantaneous because of the large number of ground state atoms available for interaction. However, because of this large number, it requires as long as several seconds to attain equilibrium polarization of the ground state atoms.

If the $He^3$ gas is subjected to an ambient magnetic field, there is an energy splitting between the two magnetic sublevels of the ground state atoms that is directly proportional to the magnitude of the ambient magnetic field. If such is the case, the circularly polarized resonance radiation and ambient magnetic field must at least have collinear components in order for the resonance radiation to cause polarization of the metastable state atoms. However, the $1^1S_0$ ground state atoms can be polarized by the process described if the contained $He^3$ gas is in a magnetic free environment. In this instance, the direction of propagation of the circularly polarized resonance radiation striking the gas is immaterial.

Considering the case where the contained $He^3$ gas is acted upon by an ambient magnetic field (usually a steady D.C. field), there will presently be described an embodiment of the invention that has utility in measuring the magnitude of the ambient magnetic field. By subjecting these atoms to an alternating magnetic field having a component at right angles to the ambient field, a frequency of the alternating field can be found that will disorient the ground state atoms, and thus destroy the polarization. When this occurs, the polarization of the metastable state atoms is readily destroyed because of the close interaction between the two states. That is to say, the polarization of the metastable state atoms is transferred to the ground state atoms, and is readily destroyed in the latter so long as the alternating magnetic field of appropriate frequency is acting on the atoms. The frequency of this field has been found to be equal to 3.2 kc./gauss.

It is important to note that the energy separation between the two magnetic sublevels of the $He^3$ ground state is solely dependent upon, and proportional to, the magnitude of the ambient magnetic field acting on these atoms. Emphasis is placed on the fact that this energy separation, for all practical purposes, is independent of all other effects such as, for example, the nature of the resonance radiation producing the phenomenon of optical pumping in the metastable state atoms. As explained previously, however, the resonance radiation must be circularly polarized in order to effect an alteration of the respective populations of the two magnetic sublevels of the $He^3$ ground state atoms. Thus so long as circularly polarized resonance radiation is used, the frequency of the alternating magnetic field will be directly proportional to the absolute value of the ambient magnetic field when the alternating field is used to destroy the polarization of the ground state atoms.

Figure 2:
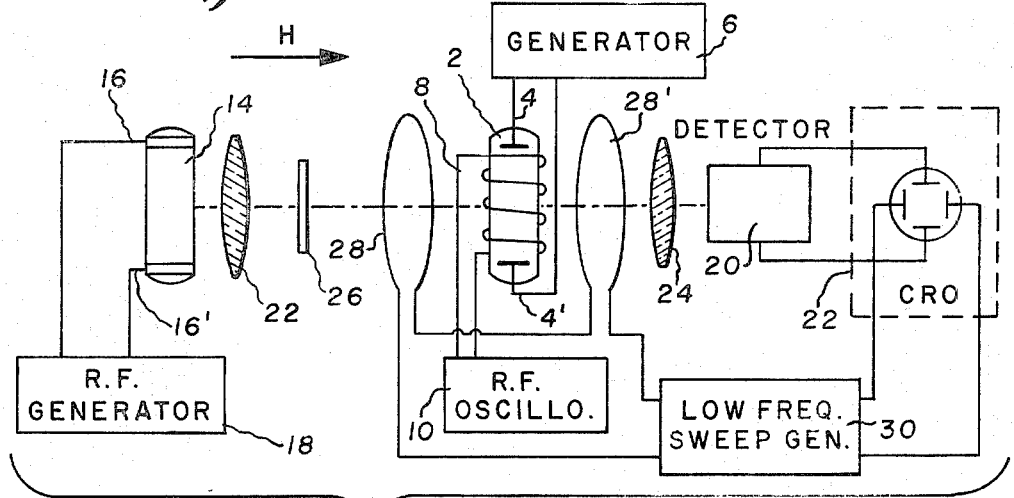
FIGURE 2 shows the apparatus of one embodiment of a $He^3$ gas magnetometer of the invention.

Referring specifically to FIGURE 2, there is shown the apparatus of one embodiment of a $He^3$ gas magnetometer, which consists of a gas container 2, hereinafter referred to as the absorption cell, with electrodes 4 and 4' connected to a suitable generator 6 for creating an electrical discharge within the cell. Positioned about the cell is coil 8 connected to an oscillator 10 for generating an alternating magnetic field perpendicular to the external field. Positioned in the region of the cell 2 is another gas container 14, hereinafter referred to as the lamp, with electrodes 16 and 16' connected to a suitable generator 18 for creating an electrical discharge therewithin so as to provide a source of resonance radiation. A lens 22 may be used to focus the resonance radiation emerging from the lamp 14 on the cell 2. A circular polarizer 26 is positioned between the lamp 14 and the cell 2 so that the resonance radiation striking the gas within the cell is circularly polarized. The direction of propagation of the resonance radiation from the lamp to the cell can be considered as defining an optical axis for the system, some of the resonance radiation being absorbed by the cell and the rest being transmitted therethrough. A suitable lens 24 is positioned on the other side of the cell to focus the transmitted resonance radiation from the lamp on a suitable photodetector 20. The output of the detector is connected to, for example, the vertical plates of a cathode ray oscilloscope. Helmholtz coils 28 and 28' are positioned about the cell and are connected to a low frequency sweep generator 30 to produce a modulation of the ambient magnetic field about its true value, the sweep generator also being connected to the horizontal plates of the oscilloscope. The whole apparatus is positioned in an ambient magnetic field H as shown in FIGURE 1. For simplicity, the magnetic field H is shown to have a direction parallel with the optical axis, wherein the lamp, two lenses, circular polarizer, Helmholtz coils, cell and detector are all aligned on this axis. It will be explained hereinafter, however, that the invention is not limited to this particular arrangement, but that the magnetic field H may have a direction other than that shown.

Enclosed within the cell 2 is $He^3$ gas maintained at a pressure of about 0.2 mm of Hg. A relatively weak electrical discharge is created within the cell, such as by an R.F. generator 6. Since resonance radiation from either a $He^3$ or $He^4$ gas discharge will produce optical pumping of the metastable $2^3S_1$ state of the $He^3$ gas, either of the two forms of helium may be used in the lamp 14. A relatively strong electrical discharge is created within the lamp 14, such as by an R.F. generator 18, to produce the resonance radiation. As the gas within the cell absorbs the resonance radiation, the metastable state of the $He^3$ gas becomes optically pumped to produce a net polarization of this state, this polarization being rapidly and continuously transferred to the ground state atoms until an equilibrium condition exists. This equilibrium condition occurs when the amount of angular momentum per unit of time transferred to the ground state atoms by the interaction process with the metastable state is equal to the amount of angular momentum per unit of time lost by the ground state atoms to the metastable atoms and by collision processes with the walls of the container, free electrons and other ions. When the equilibrium condition is attained, a minimum amount of resonance radiation from the lamp will be absorbed in the cell, and a maximum amount will be striking the detector 20.

Subjecting the atoms within the cell to an alternating magnetic field which has a direction perpendicular to the optical axis of the system produces a disorienting effect of the ground state helium atoms when the frequency of the alternating magnetic field is of the correct value. The frequency of this field is directly proportional to the magnitude of the magnetic field causing the energy splitting of these ground states and is equal to $E/h$, where E is the energy separation between the magnetic sublevels of the $1^1S_0$ ground state atoms, and $h$ is Planck's constant. As noted above, the frequency required to destroy the polarization of the ground state is about 3.2 kc./sec.-gauss. As the polarization of the ground state is destroyed, the polarization of the metastable state is similarly destroyed, because of the close interaction between the two states. The destruction of the polarization of the metastable state is rapid because of the large number of ground state atoms available to interact with the relatively few metastable states. Although the resonance radiation impinging on the cell in no way affects the polarization of the ground state atoms directly, a different amount of absorption of the resonance radiation by the metastable state atoms occurs upon destruction of the polarization of the ground states, because of the attendant destruction of the polarization of the metastable states. Thus, less resonance radiation is transferred to the detector, and this can be displayed as a signal on the oscilloscope as follows: if the ambient magnetic field is modulated about its true value by some means such as the Helmholtz coils 28 and 28' powered by a low frequency sweep generator 30, a resonance signal can be displayed on the oscilloscope as shown in FIGURE 3. Electrically, the sweep generator is connected to the horizontal deflection plates of the scope and the output of the detector is connected to the vertical deflection plate of the oscilloscope. The peak of the resonance signal is shown to occur at a frequency $f_0$, that being the frequency of the alternating magnetic field which is directly proportional to the magnitude of the ambient magnetic field. Alternatively, the Helmholtz coils can be obviated by modulating the frequency of the alternating magnetic field about the frequency $f_0$.

The beam of resonance radiation from the lamp 14 in FIGURE 2 has a dual function. The beam is used to optically pump the metastable state atoms of the He$^3$ gas in the cell, and is also used to monitor the degree of polarization of this state. Because of the relatively long time required to polarize the ground state atoms in the cell from a nonpolarized condition, the sweep frequency of the horizontal plates of the oscilloscope is as long as several seconds. Thus the response of this system is time-limited.

The apparatus of another embodiment of a He$^3$ magnetometer is shown in FIGURE 4. For simplicity, a plan view of the apparatus is shown, wherein a cross-beam arrangement is utilized. The cross-beam arrangement has been successfully used by those working with the alkali gas magnetometers, as evidenced in an article by W. E. Bell and A. L. Bloom, Phys. Rev. 107, 1559 (1957), and provides another means for monitoring the degree of polarization of the atomic state of the gas undergoing optical pumping. As such, the cross-beam arrangement for monitoring the system does not form any part of the present invention, but is described hereinafter because of its usefulness with the He$^3$ magnetometer.

As shown in FIGURE 4 the lamp 14, lens 22 and circular polarizer 26 are used as described with reference to FIGURE 2. Another lamp 50, lens 52 and circular polarizer 54 are aligned to form an optical axis at a right angle to the direction of the ambient magnetic field H. The lamp 14 is used as the source of resonance radiation to optically pump the gas in the cell 2, whereas the beam of resonance radiation from the lamp 50 is used to monitor the degree of polarization of the sublevels of the $1^1S_0$ ground state of the gas in the cell. A suitable lens 56 and detector 20 are positioned on the opposite side of the cell as the lamp 50 to receive light from the same. As before, the output of the detector is connected to the vertical deflection plates of the oscilloscope 22. The coil 8 and generator is connected as shown in FIGURE 2.

Instead of completely destroying the polarization of the gas within the cell by means of the coil 8, the power applied to the coil from the generator is limited to an amount just sufficient that at the appropriate frequency the magnetic moments of the polarized ground state atoms are caused to precess in phase, but not sufficient to cause them to be disoriented and depolarized. The appropriate frequency to cause this in-phase precession is just the Larmor frequency, i.e., that frequency at which the individual magnetic moments of the atoms precess in the ambient magnetic field. When the moments of the polarized ground state atoms are then caused to precess in phase by the appropriate alternating magnetic field, the resonance radiation striking the detector will be modulated at the Larmor frequency. As stated above, this frequency is 3.2 kc./sec. for every gauss of the ambient magnetic field. Thus, since the polarization of the He$^3$ gas within the cell is not destroyed for purposes of monitoring the polarization of the same, the magnetic field can be measured in a much shorter time than the system as shown in FIGURE 2.

Although the invention has been described with reference to specific embodiments, modifications and substitutions will become apparent to those skilled in the art that do not depart from the scope of the invention as defined by the appended claims.

What is claimed is:
1. An apparatus for polarizing the $1^1S_0$ ground state atoms of the He$^3$ gas, comprising:
   (a) means for containing in a confined zone He$^3$ gas having atoms thereof in the $1^1S_0$ ground state and the $2^3S_1$ metastable state capable of undergoing collisions in said zone;
   (b) means for exciting atoms of the He$^3$ gas to a metastable $2^3S_1$ state in said zone; and
   (c) means for polarizing the atoms in said metastable state in said zone, thereby to provide by said collisions polarization of said $1^1S_0$ ground state atoms.

2. The apparatus as defined in claim 1 wherein said means for polarizing the atoms in said metastable state includes a beam of circularly polarized optical resonance radiation.

3. An apparatus for measuring the magnitude of an ambient magnetic field acting upon contained He$^3$ gas, comprising:
   (a) means containing He$^3$ gas in a zone inducing collisions between atoms in the $2^3S_1$ metastable state and the $1^1S_0$ ground state thereof;
   (b) means for exciting atoms of said contained He$^3$ gas to the metastable $2^3S_1$ state;
   (c) means for optically polarizing the atoms in said metastable state, thereby to provide by said collisions polarization of the $1^1S_0$ ground state atoms of said contained He$^3$ gas, and;
   (d) means for subjecting said He$^3$ gas to an alternating magnetic field whose frequency is equal to $E/h$, where E is the energy separation between the magnetic sublevels of said $1^1S_0$ ground state atoms in said ambient magnetic field, and $h$ is Planck's constant.

4. An apparatus for measuring the magnitude of an ambient magnetic field acting upon contained He$^3$ gas, comprising:
   (a) means containing He$^3$ gas in a zone inducing collisions between atoms in the $2^3S_1$ metastable state and the $1^1S_0$ ground state thereof;
   (b) means for exciting atoms of said contained He$^3$ gas to the metastable $2^3S_1$ state;
   (c) means for subjecting said He$^3$ gas to a beam of circularly polarized optical resonance radiation having a component of propagation collinear with the direction of said ambient magnetic field to polarize the atoms in said metastable state, thereby to provide by said collisions polarization of said $1^1S_0$ ground state atoms, and;
   (d) means for subjecting said gas to an alternating magnetic field, said alternating field having:
      (i) a component perpendicular to the direction of said ambient magnetic field, and;
      (ii) a frequency equal to $E/h$, where E is the energy separation between the magnetic sublevels of said $1^1S_0$ ground state atoms, and $h$ is Planck's constant.

5. The apparatus as defined in claim 4 including means for monitoring the amount of resonance radiation absorbed by said metastable state atoms.

6. An apparatus for measuring the magnitude of an ambient magnetic field acting upon contained He$^3$ gas, comprising:
   (a) means containing He$^3$ gas in a zone inducing collisions between atoms in the $2^3S_1$ metastable state and the $1^1S_0$ ground state thereof;
   (b) means for exciting atoms of said contained He$^3$ gas to the metastable $2^3S_1$ state;
   (c) means for subjecting said He$^3$ gas to circularly polarized optical resonance radiation, said radiation having:
      (i) a first component of propagation collinear with the direction of said ambient field to polarize the atoms in said metastable state, thereby to provide by said collisions polarization of said $1^1S_0$ ground state atoms, and;
  (ii) a second component of propagation perpendicular to the direction of said ambient field;
(d) means for subjecting said He³ gas to an alternating magnetic field, said alternating field having:
  (i) a component perpendicular to the direction of said ambient field, and;
  (ii) a frequency equal to $E/h$, where E is the energy separation between the magnetic sublevels of said $1^1S_0$ ground state atoms, and $h$ is Planck's constant, and;
(e) means for monitoring the amount of said second component of said resonance radiation absorbed by the atoms in said metastable state.

References Cited by the Examiner

UNITED STATES PATENTS 3,071,721  1/63  Dehmelt _____ 324—0.5

OTHER REFERENCES

Anderson et al.: Physical Review, vol. 116, No. 1, October 1959, pages 87–99 incl.

Bouchiat et al.: Physical Review Letters, vol. 5, No. 8, October 1960, pages 373–375 incl.

Colgrove et al.: Physical Review, vol. 119, No. 2, July 1960, pages 680–690 incl.

Drake et al.: Physical Review, vol. 112, No. 5, December 1958, pages 1627–1637 incl.

Rice: I.R.E. International Convention Record, vol. 9, Pt. 9, March 20–23, 1961, pages 244–248 incl.

Schearer: Advances in Quantum Electronics, edited by Jay R. Singer, Columbia University Press, New York, 1961, pages 239–251 incl. Paper presented at the Second International Conference on Quantum Electronics, Berkeley, Calif., March 23–25, 1961.

White et al.: Physical Review Letters, vol. 3, No. 9, November 1959, pages 428 and 429.

CHESTER L. JUSTUS, *Primary Examiner.*

MAYNARD R. WILBUR, *Examiner.*